United States Patent [19]

Komiya et al.

[11] Patent Number: 4,625,156
[45] Date of Patent: Nov. 25, 1986

[54] CONTROL DEVICE

[75] Inventors: Yutaka Komiya, Tokyo; Masahiro Tomosada, Kawasaki; Shinichi Nakamura, Tokyo; Masanori Miyata, Yokohama; Hideki Adachi, Kawasaki; Masayuki Hirose, Yokohama, all of Japan

[73] Assignee: Canon Kabushiki Kaisha, Tokyo, Japan

[21] Appl. No.: 544,619

[22] Filed: Oct. 24, 1983

[30] Foreign Application Priority Data

Nov. 2, 1982 [JP]  Japan .................................. 57-191789

[51] Int. Cl.[4] ............................................. H02P 5/52
[52] U.S. Cl. ........................................ 318/85; 318/78;
  318/314; 318/625; 318/608
[58] Field of Search .................... 318/85, 625, 78, 314,
  318/606, 607, 608, 625

[56]  References Cited

U.S. PATENT DOCUMENTS

| | | | |
|---|---|---|---|
| 3,718,845 | 2/1973 | Bejach et al. | 318/85 X |
| 4,135,118 | 1/1979 | Seeger et al. | 318/85 |
| 4,249,118 | 2/1981 | Roof | 318/484 |
| 4,310,787 | 1/1982 | Seeger et al. | 318/85 |
| 4,314,185 | 2/1982 | Schneider et al. | 318/85 |
| 4,408,144 | 10/1983 | Lukes | 318/112 X |
| 4,443,742 | 4/1984 | Schneider et al. | 318/85 |

Primary Examiner—B. Dobeck
Attorney, Agent, or Firm—Fitzpatrick, Cella, Harper & Scinto

[57]  ABSTRACT

A device for controlling plural loads with phase locked loop control method by means of reference signals of different phases in order to avoid peak in electric power consumption.

7 Claims, 4 Drawing Figures

FIG. 2

(A) REFERENCE FREQ (fs OR fs')

(B) FEEDBACK FREQ (fR OR fR')

(C) PWM OUTPUT

FIG. 4

(A) fo (B) PWM OUTPUT TO LOAD 7

(C) PWM OUTPUT TO LOAD 10

(D) CURRENT I'

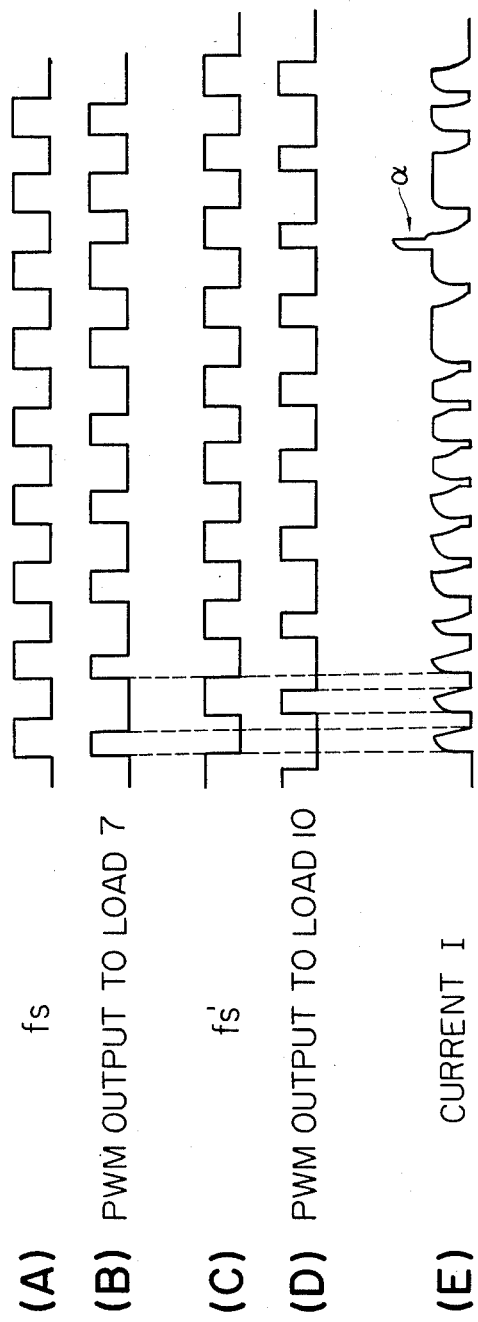

CONTROL DEVICE

BACKGROUND OF THE INVENTION

1. Field of the Invention

The present invention relates to a control device for controlling the function of plural loads, and more particularly to a control device for phase locked loop control of plural DC motors for use in a copier or the like.

2. Description of the Prior Art

In an image recording apparatus such as a copier or a facsimile apparatus, the use of phase locked loop (PLL) control is already known for controlling plural DC motors for driving photosensitive drum, optical system, etc. Various methods have been proposed and practiced for such PLL control, but none is designed in consideration of the capacity of the power supply. The DC motors for driving a copier usually consume a power of several amperes in total, so that the PLL control, if conducted independently for each load or on a same reference frequency, will lead to a very large power consumption, thus requiring the power source of an increased capacity, together with elements and protective parts of a matching capacity, eventually leading to an increased manufacturing cost.

SUMMARY OF THE INVENTION

An object of the present invention is to eliminate the above-mentioned drawbacks.

Another object of the present invention is to provide a control device capable of reducing the burden to the power source.

Still another object of the present invention is to provide a control device capable of exactly controlling plural loads with a simple structure.

Still other objects of the present invention will become fully apparent from the following description to be taken in conjuction with the attached drawings and also from the appended claims.

BRIEF DESCRIPTION OF THE DRAWINGS

FIGS. 2(A)–(C) are waveform charts showing the principle of phase comparison conducted in the circuit shown in FIG. 1;

FIGS. 3(A)–(E) are waveform charts showing various output signals in the circuit shown in FIG. 1; and FIGS. 4(A)–(D) are waveform charts showing various output signals in a conventional method.

DETAILED DESCRIPTION OF THE PREFERRED EMBODIMENTS

Figure 1:
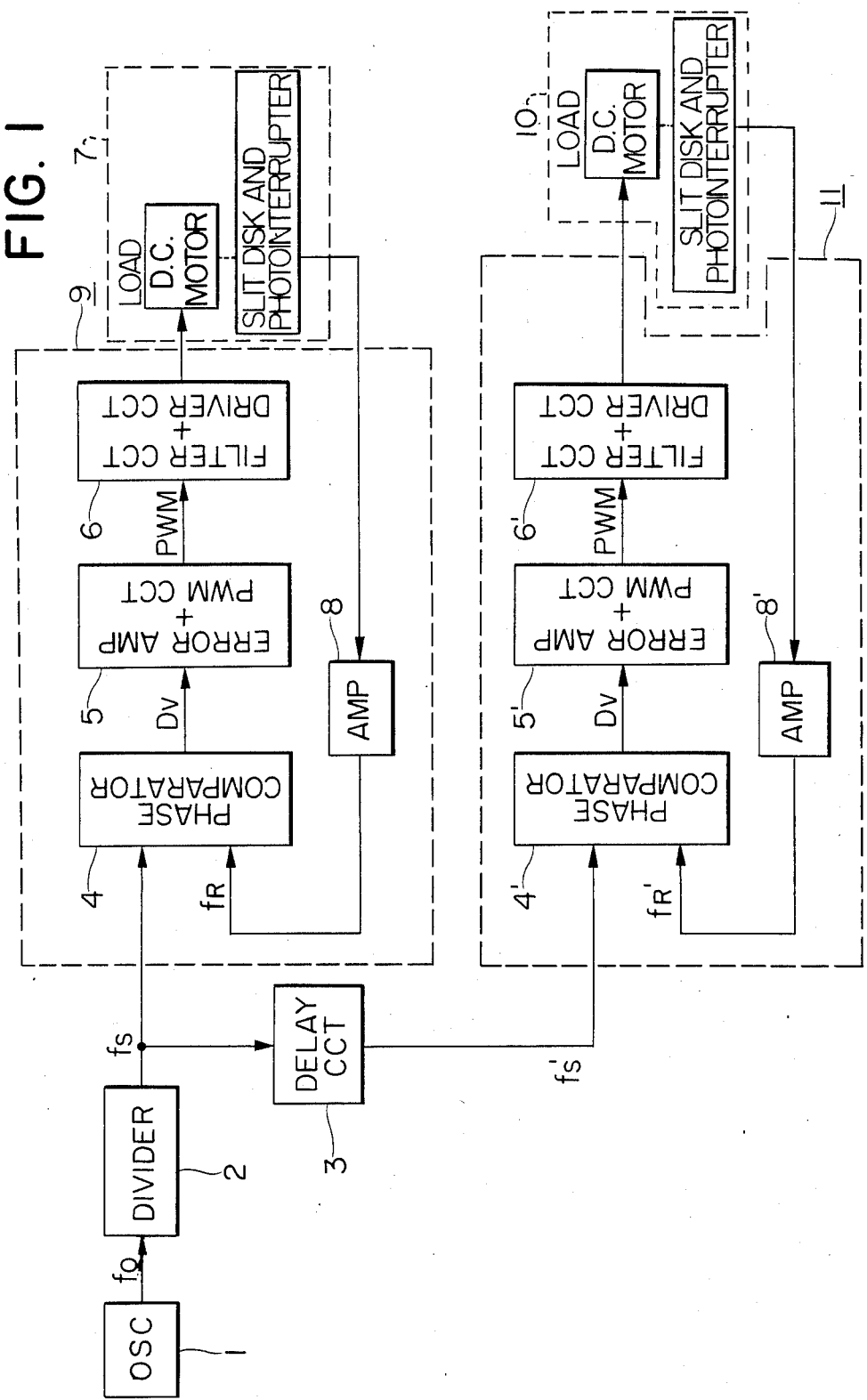
FIG. 1 is a block diagram showing a control circuit embodying the present invention.

Now the present invention will be clarified in detail with particular reference to the attached drawings.

FIG. 1 shows a schematic example of a control circuit for use in a copier or the like embodying the present invention, wherein provided are a common original oscillator 1 for generating clock signals of a frequency f0; a frequency divider 2 for dividing the frequency f0 to obtain a first reference frequency fs; a delay circuit 3 for generating clock signals of a second reference frequency fs' displaced in phase by a determined amount, for example 180°, from said first reference frequency fs; a phase comparator 4 for comparing the phase of a feedback frequency $f_R$ from a load to be explained later with that of the reference frequency fs to generate an average DC voltage Dv proportional to the difference or error between said phases; a pulse width modulating circuit 5 composed of an error amplifier and a pulse width modulator thereby generating a pulse width modulated output signal corresponding to the phase error in response to the output signal Dv of the phase comparator 4; a load driving circuit 6 composed of a filter circuit and a driving circuit for driving a first load 7 according to said pulse width modulated (PWM) output signal, wherein said load 7 is a DC motor for driving for example a photosensitive drum or an optical system of a copier; and an amplifier 8 for amplifying a feedback signal corresponding to the rotating speed of said load 7 to generate a signal of the above-mentioned feedback frequency $f_R$, wherein the above-described circuits 4, 5, 6 and 8 constitute a PLL control circuit 9 for the phase control of the load 7.

There are further shown a second load 10; and a PLL control circuit 11 composed of a phase comparator 4', a PWM circuit 5', a load driving circuit 6' and an amplifier 8' in a similar manner as the above-described control circuit 9 for effecting phase control of the second load 10 in response to the second reference frequency fs' supplied from the delay circuit 3.

In case the loads 7, 10 are DC motors as explained above, the feedback pulse signals can be generated by encoders composed of slit disks mounted on the shafts of said DC motors and photointerrupters.

Now there will be given explanation of on the function of the circuit shown in FIG. 1.

The frequency divider 2 effects frequency division of the clock signal of the frequency f0 supplied from the oscillator 1, thereby supplying clock signal of the frequency fs as the reference clock signal to the phase comparator 4, for phase comparison with the feedback signal of the frequency $f_R$ synchronized with the rotating speed of the load 7. The error signal Dv generated by the phase comparator is converted into the PWM output signal by the circuit composed of the error amplifier and the pulse width modulator. Said PWM output signal is supplied to the circuit 6 composed of a suitable filter circuit and the driving circuit, thereby driving the load 7.

The clock signal of the frequency fs generated by the frequency divider 2 is also supplied to the delay circuit 3 for supplying the clock signal of the frequency fs' suitably delayed in phase to the circuit 11 for another load. Said circuit 11 compares the phase of the clock signal of the frequency fs' with that of the signal of the frequency $f_R'$ corresponding to the rotating speed of the second load 10.

FIGS. 2(A)–(C) show an example of the phase comparison effected in the circuit 9 or 11 shown in FIG. 1, wherein the aforementioned PWM signal is generated as a control signal, corresponding to the phase difference between the reference frequency fs or fs' and the feedback frequency $f_R$ or $f_R'$, in order to reduce said difference.

The actual circuit is not necessarily limited to the simple structure shown in FIG. 1 but may be constructed as a combination of the phase control of the present invention and another speed control for achieving load control of better precision. For example it is possible to effect the control by detecting the error in speed until the difference between the feedback frequency and the reference frequency reaches a determined value, and to effect the phase control thereafter. Such speed control is achieved by converting the feedback frequency from the load into a voltage and comparing said voltage with a reference voltage. On the other hand the phase control is achieved by a signal indicating an advanced or delayed phase, and the locking range for the phase control is preferably reached through the combination of the speed control signal and the phase control signal.

FIGS. 3(A)-(E) show an example of timings of the output signals from the circuit shown in FIG. 1, wherein the frequency fs is different by 180° from the frequency fs' so that a waveform (FIG. 3(E)) the total current I flowing in the loads 7, 10 shows an overshoot only at a point α. In this manner a suitable phase displacement in the reference clock signals enables one to significantly reduce the current load on the power source in comparison with the conventional control process. In case the phases of the frequencies fs, fs' mutually coincide as in the conventional process, as shown in FIGS. 4(A)-(D), a larger current I' for the loads 7, 10 shows for a much longer period.

Figures 2, 4:
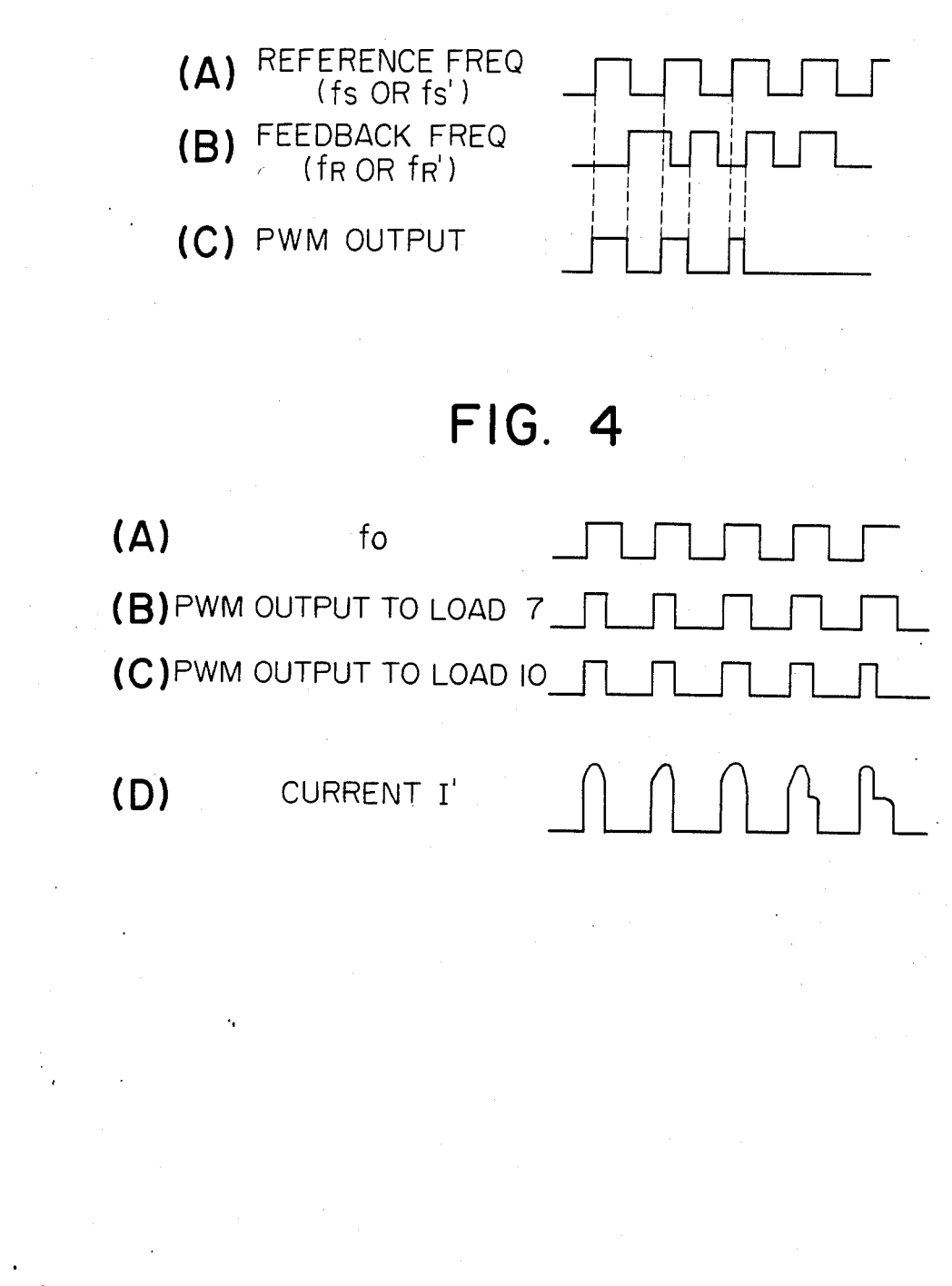

It is to be understood that the waveforms shown in FIGS. 2 to 4 are simplified in order to clarify the working principle of the present invention, though the actual waveforms may not necessarily be as clean as illustrated because of the time constants of the motor, characteristics of filters, delays in the feedback loops etc. Also an analog PLL control circuit may be employed in a similar manner instead of the digital PLL control circuit employed in the foregoing embodiment.

Furthermore, instead of generating plural clock signals of different phases from a single oscillator as in the foregoing embodiment, there may be provided plural reference oscillators for respectively generating plural clock signals of different phases. In case of driving plural stepping motors (not shown) such pulse signals of different phases may be utilized for driving said stepping motors in order to reduce the burden to the power source.

As explained in the foregoing, the present invention allows load control with a reduced burden to the power source, by generating frequencies of different phases from a clock signal supplied from an oscillator and utilizing such frequencies of different phases respectively for reference frequencies of different PLL control circuits.

The present invention is by no means limited to the foregoing embodiment but is subject to various modifications within the scope of the appended claims.

What is claimed is:

1. A control device comprising:
first and second driving means for driving operable means;
first and second detecting means for generating first and second detection signals respectively indicating the drive states of said first and second driving means;
reference signal generating means for generating first and second reference signals of different phases; and
control means for controlling said first and second driving means; said control means including first and second comprison means for separately comparing said first and second detection signals to said first and second reference signals, respectively and means for generating first and second control signals for driving said first and second driving means in response to output signals from said first and second comparison means, respectively;
said control means being adapted to generate said first and second control signals in response to the phase difference between said first and said second detection signals and said first and second reference signals, respectively.

2. A control device according to claim 1, wherein said driving means each comprises a DC motor.

3. A control device comprising:
first and second driving means for driving operable means;
first and second detecting means for generating first and second detection signals respectively indicating the drive states of said first and second driving means;
reference signal generating means for generating first and second reference signals of different phases; and
control means for controlling said first and second driving means; said control means inlcuding first and second comparison means for separately comparing said first and second detection signals to said first and second reference signals, respectively amd means for generating first and second control signals for driving said first and second driving means in response to output signals from said first and second comparison means, respectively;
said reference signal generating means being constructed and arranged to generate said second reference signal by delaying the phase of said first reference signal by a determined amount.

4. A control device according to claim 3 wherein said driving means comprises a DC motor.

5. A control device according to claim 4 wherein said detecting means comprises an encoder composed of a slit disk and a photointerrupter.

6. A control device according to claim 1 wherein said first and second reference signal have the same frequency.

7. A control device according to claim 3 wherein said first and second reference signals have the same frequency.

* * * * *

UNITED STATES PATENT AND TRADEMARK OFFICE
CERTIFICATE OF CORRECTION

PATENT NO. : 4,625,156
DATED : November 25, 1986
INVENTOR(S) : YUKATA KOMIYA, ET AL.

It is certified that error appears in the above-identified patent and that said Letters Patent is hereby corrected as shown below:

COLUMN 2

Line 28,   "of on" should read --of--.
    Line 37,   "comparator is" should read --comparator 4 is--.
    Line 38,   "circuit composed" should read --circuit 5 composed--.

COLUMN 4

Line 8,    "comprison" should read --comparison--.
    Line 36,   "amd" should read --and--.
    Line 51,   "signal" should read --signals--.

Signed and Sealed this

Fifteenth Day of September, 1987

Attest:

DONALD J. QUIGG

*Attesting Officer*        *Commissioner of Patents and Trademarks*